(12) United States Patent
Tsukamoto et al.

(10) Patent No.: US 10,464,567 B2
(45) Date of Patent: Nov. 5, 2019

(54) SHIFT CONTROL DEVICE OF VEHICLE

(71) Applicant: TOYOTA JIDOSHA KABUSHIKI KAISHA, Toyota-shi, Aichi (JP)

(72) Inventors: Norihiro Tsukamoto, Toyota (JP); Tomohiro Asami, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 137 days.

(21) Appl. No.: 15/889,339

(22) Filed: Feb. 6, 2018

(65) Prior Publication Data

US 2018/0237022 A1 Aug. 23, 2018

(30) Foreign Application Priority Data

Feb. 17, 2017 (JP) ................................. 2017-028260

(51) Int. Cl.
| | |
|---|---|
| *B60W 10/06* | (2006.01) |
| *B60W 10/115* | (2012.01) |
| *F16H 63/50* | (2006.01) |
| *B60W 30/19* | (2012.01) |
| *F16H 61/04* | (2006.01) |
| *F16H 61/06* | (2006.01) |

(52) U.S. Cl.
CPC ............ *B60W 30/19* (2013.01); *B60W 10/06* (2013.01); *B60W 10/115* (2013.01); *F16H 61/0403* (2013.01); *F16H 61/061* (2013.01); *F16H 63/502* (2013.01); *B60W 2510/1095* (2013.01); *B60W 2710/0666* (2013.01); *B60W 2710/0672* (2013.01); *B60W 2710/1005* (2013.01); *B60W 2710/1011* (2013.01)

(58) Field of Classification Search
CPC ........ F16H 63/502; B60W 2510/1095; B60W 2710/0672; B60W 30/19; B60W 10/06; B60W 10/115; B60W 2710/0666
See application file for complete search history.

(56) References Cited

U.S. PATENT DOCUMENTS

| | | | | |
|---|---|---|---|---|
| 5,020,391 | A | * | 6/1991 | Aoki ..................... F16H 61/061 477/143 |
| 9,493,148 | B2 | * | 11/2016 | Nefcy ................... B60W 10/06 |
| 9,663,110 | B2 | * | 5/2017 | Ishikawa ................ F16H 61/70 |

FOREIGN PATENT DOCUMENTS

JP 2006-112247 A 4/2006

* cited by examiner

*Primary Examiner* — Sherry L Estremsky
(74) *Attorney, Agent, or Firm* — Oliff PLC

(57) ABSTRACT

An internal combustion engine and a multi-speed transmission in series, the shift control device comprising: a control portion providing a downshift control input shaft rotation speed of the multi-speed transmission is increased through a torque-up control of the internal combustion engine toward a post-shift input shaft rotation speed in a neutral state where a release-side frictional engagement device during a downshift of the multi-speed transmission is released, an engagement-side frictional engagement device to be engaged after the shift; and a torque setting portion setting a required torque of the internal combustion engine in the torque-up control of the internal combustion engine increasing rate of an actual torque of the internal combustion engine becomes smaller in the case of a shift pattern having a large internal inertia of the multi-speed transmission during the downshift as compared to the case of a shift pattern in which the internal inertia is small.

8 Claims, 5 Drawing Sheets

|  | C1 | C2 | C3 | C4 | B1 | B2 |
|---|---|---|---|---|---|---|
| 1st | O |  |  |  |  | O |
| 2nd | O |  |  |  | O |  |
| 3rd | O |  | O |  |  |  |
| 4th | O |  |  | O |  |  |
| 5th | O | O |  |  |  |  |
| 6th |  | O |  | O |  |  |
| 7th |  | O | O |  |  |  |
| 8th |  | O |  |  | O |  |
| Rev |  |  | O |  |  | O |

O: ENGAGEMENT.  BLANK: RELEASE

SHIFT CONTROL DEVICE OF VEHICLE

This application claims priority from Japanese Patent Application No. 2017-028260 filed on Feb. 17, 2017, the disclosure of which is herein incorporated by reference in its entirety.

BACKGROUND OF THE INVENTION

1. Field of the Invention

The present invention relates to a shift control device of a vehicle including an internal combustion engine and a multi-speed transmission.

2. Description of the Related Art

In a vehicle including an internal combustion engine and a multi-speed transmission, a shift control device of a vehicle is known that, at the time of a downshift of the multi-speed transmission, releases an engagement device forming a pre-shift gear position into a neutral state while providing a feedback control of an engine torque to synchronize a rotation speed of the internal combustion engine with a post-shift rotation speed so as to engage an engagement device forming a post-shift gear position after synchronization of the rotation speed of the internal combustion engine. This corresponds to an automotive shift control device described in Patent Document 1. It is described in Patent Document 1 that a target engine torque is obtained by adding to a driver request torque based on an accelerator opening degree, a predetermined torque-up amount for maintaining an engine rotation speed of an engine (internal combustion engine) at a post-shift rotation speed (synchronous rotation speed), during a predetermined torque-up time after a start of an engagement operation of an engagement device, so as to control an engine torque to this target engine torque. It is also described that even after the engine rotation speed reaches the synchronous rotation speed, an engine torque for maintaining the synchronous rotation speed is output to suppress a shift shock by maintaining the synchronous rotation speed during a response delay of the engagement device.

PRIOR ART DOCUMENT

Patent Document

Patent Document: JP-2006-112247A

In a downshift of the multi-speed transmission controlled as in the shift control device of Patent Document 1, when the multi-speed transmission is in the neutral state and the multi-speed transmission has a large internal inertia during a torque-up control of the engine for synchronizing an input shaft rotation speed of the multi-speed transmission with the synchronous rotation speed, a shift shock may occur since a drive force is transmitted to the output side of the multi-speed transmission in response to a reaction force due to the internal inertia associated with an increase in rotation due to the torque-up control of the engine even in the neutral state.

SUMMARY OF THE INVENTION

The present invention was conceived in view of the situations and it is therefore an object of the present invention to provide, in a vehicle including an internal combustion engine and a multi-speed transmission, a control device suppressing a shift shock due to an internal inertia in a device providing a downshift control of synchronizing an input shaft rotation speed of the multi-speed transmission with a post-shift rotation speed through a torque-up control of the internal combustion engine in a neutral state of the multi-speed transmission so as to engage an engagement-side engagement device.

The object indicated above is achieved according to a first aspect of the present invention, which provides a shift control device of a vehicle including an internal combustion engine and a multi-speed transmission in series, the shift control device comprising: a control portion providing a downshift control in which an input shaft rotation speed of the multi-speed transmission is increased through a torque-up control of the internal combustion engine toward a post-shift input shaft rotation speed in a neutral state where a release-side frictional engagement device to be released during a downshift of the multi-speed transmission is released, so as to engage an engagement-side frictional engagement device to be engaged after the shift; and a torque setting portion setting a required torque of the internal combustion engine in the torque-up control of the internal combustion engine such that an increasing rate of an actual torque of the internal combustion engine becomes smaller in the case of a shift pattern having a large internal inertia of the multi-speed transmission during the downshift as compared to the case of a shift pattern in which the internal inertia is small.

A second aspect of the present invention provides the shift control device of a vehicle recited in the first aspect of the invention, wherein in the torque-up control of the internal combustion engine, the control portion provides in order a first torque-up control of controlling the internal combustion engine by using as a target a first required torque for improving responsiveness of the actual torque to the required torque of the internal combustion engine and a second torque-up control of controlling the internal combustion engine by using as a target a second required torque for increasing the input shaft rotation speed of the multi-speed transmission toward the post-shift input shaft rotation speed, and wherein in the case of the shift pattern having the large internal inertia, the torque setting portion corrects the first required torque set in the case of the shift pattern having the small internal inertia such that the first required torque set in the case of the shift pattern having the large internal inertia is made smaller than the first required torque set in the case of the shift pattern having the small internal inertia.

A third aspect of the present invention provides the shift control device of a vehicle recited in the first or second aspect of the invention, comprising a determining portion determining that the shift pattern has the large internal inertia when the internal inertia of the multi-speed transmission during the downshift is larger than a predetermined value set in advance, and that the shift pattern has the small internal inertia when the internal inertia is not more than the predetermined value.

A fourth aspect of the present invention provides the shift control device of a vehicle recited in any one of the first through third aspects of the invention, wherein the internal inertia of the multi-speed transmission during the downshift is determined based on a frictional engagement device kept engaged before and after the shift.

According to the shift control device recited in the first aspect of the invention, when the shift pattern has the large internal inertia of the multi-speed transmission during the downshift, the increasing rate of the actual torque of the internal combustion engine becomes smaller as compared to when the shift pattern has the small internal inertia, so that the actual torque of the internal combustion engine gradually increases in the shift pattern having the large internal inertia, thereby suppressing the transmission of the drive force to the output side of the multi-speed transmission due to the reaction force of the internal inertia. Therefore, the shift shock is restrained from occurring due to a rapid increase in the drive force transmitted to the output side of the multi-speed transmission.

According to the shift control device recited in the second aspect of the invention, when the shift pattern has the large internal inertia, the first required torque of the internal combustion engine according to the first torque-up control becomes smaller as compared to when the shift pattern has the small internal inertia, so that the actual torque of the internal combustion engine gradually increases, thereby suppressing the torque transmission to the output side of the multi-speed transmission due to the reaction force of the internal inertia.

According to the shift control device recited in the third aspect of the present invention, the shift pattern having the large internal inertia and the shift pattern having the small internal inertia can easily be determined based on whether the internal inertia is larger than the predetermined value or not more than the predetermined value.

According to the shift control device recited in the fourth aspect of the invention, since the internal inertia of the multi-speed transmission varies depending on the frictional engagement device kept engaged before and after the shift, the internal inertia can easily be calculated by determining the frictional engagement device kept engaged before and after the shift.

DESCRIPTION OF EMBODIMENTS

An example of the present invention will now be described in detail with reference to the drawings. In the following example, the figures are simplified or deformed as needed and portions are not necessarily precisely drawn in terms of dimension ratio, shape, etc.

Example

Figure 1:
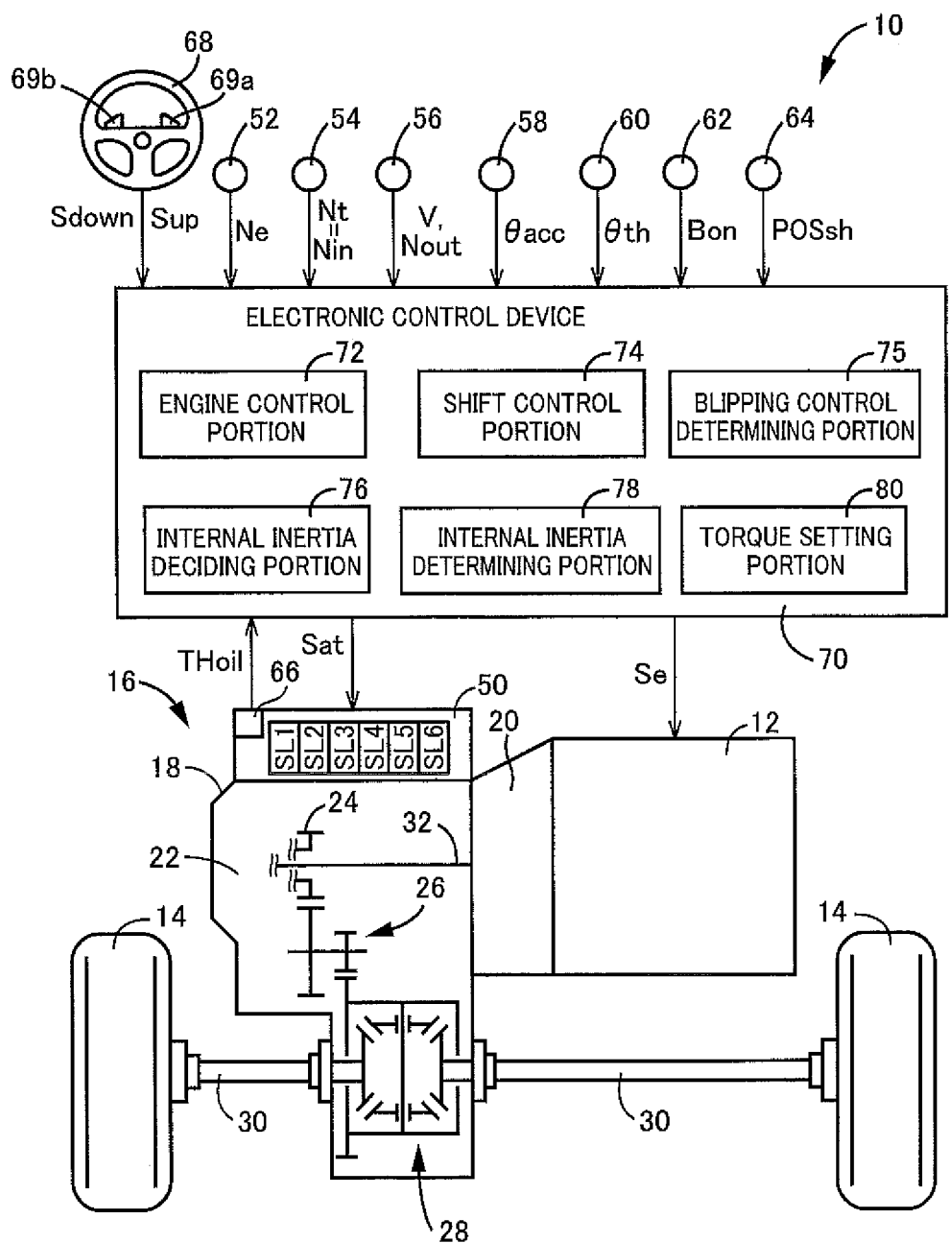
FIG. 1 is a diagram for explaining a general configuration of a vehicle to which the present invention is applied and is a diagram for explaining main portions of a control system for various controls in the vehicle.

FIG. 1 is a diagram for explaining a general configuration of a vehicle 10 to which the present invention is applied and is a diagram for explaining main portions of a control system for various controls in the vehicle 10. In FIG. 1, the vehicle 10 includes an engine 12, drive wheels 14, and a vehicle power transmission device 16 (hereinafter referred to as a power transmission device 16) disposed in a power transmission path between the engine 12 and the drive wheels 14. The power transmission device 16 includes, in a case 18 acting as a non-rotating member attached to a vehicle body, a torque converter 20, a multi-speed transmission (step-variable transmission) 22, a reduction gear mechanism 26 coupled to a transmission output gear 24 that is an output rotating member of the multi-speed transmission 22, a differential gear (differential gear device) 28 coupled to the reduction gear mechanism 26, etc. The power transmission device 16 also includes a pair of drive shafts (axles) 30 etc. coupled to the differential gear 28. In the power transmission device 16, the power (synonymous with torque and drive force if not particularly distinguished) output from the engine 12 is transmitted sequentially through the torque converter 20, the multi-speed transmission 22, the reduction gear mechanism 26, the differential gear 28, the drive shaft 30, etc. to the driving wheels 14.

The engine 12 is a drive force source of the vehicle 10 and is a known internal combustion engine such as a gasoline engine and a diesel engine. The engine 12 has an engine torque Te controlled by an electronic control device 70 described later controlling operating states such as an intake air amount, a fuel injection amount, and an ignition timing. The engine 12 corresponds to an internal combustion engine of the present invention.

Figures 2, 3:
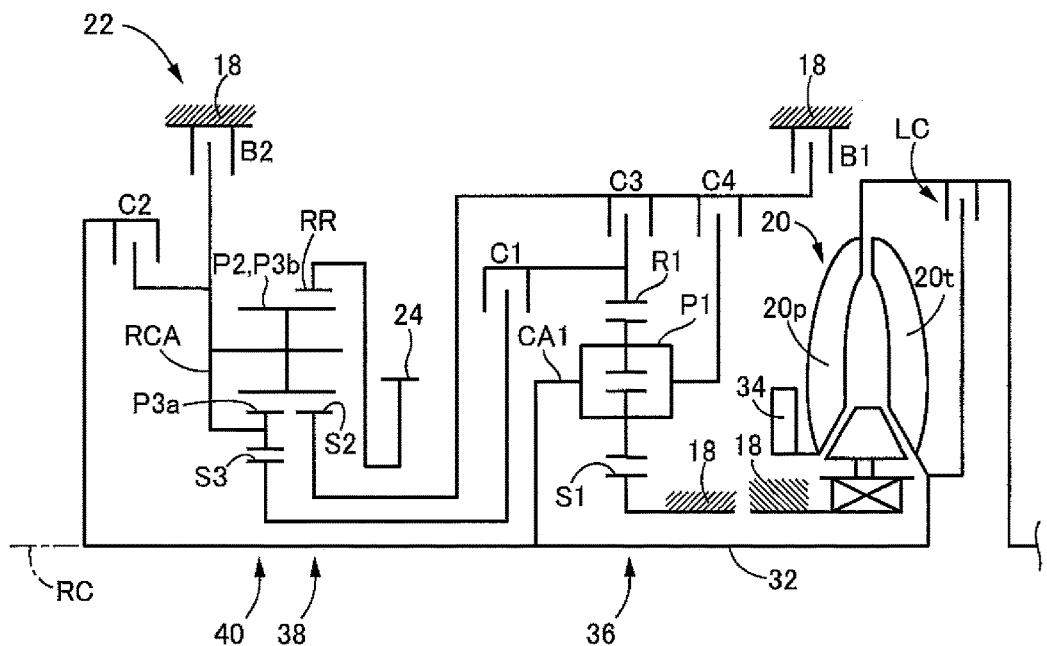
FIG. 2 is a schematic for explaining an example of a torque converter and a multi-speed transmission.
FIG. 3 is an engagement operation table for establishing gear positions in the multi-speed transmission of FIG. 2.

FIG. 2 is a schematic for explaining an example of the torque converter 20 and the multi-speed transmission 22. The torque converter 20, the multi-speed transmission 22, etc. are configured substantially symmetrically with respect to an axial center RC of a transmission input shaft 32 (input shaft 32) that is an input rotating member of the multi-speed transmission 22 and have lower halves from the axial center RC not shown in FIG. 2.

In FIG. 2, the torque converter 20 is disposed to rotate around the axial center RC in a power transmission path between the engine 12 and the multi-speed transmission 22 and is a fluid transmission device including a pump impeller 20p coupled to the engine 12, a turbine impeller 20t coupled to the input shaft 32, etc. The input shaft 32 also serves as a turbine shaft rotationally driven by the turbine impeller 20t. The power transmission device 16 also includes a lockup clutch LC capable of direct coupling between the pump impeller 20p and the turbine impeller 20t (i.e., between input/output rotating members of the torque converter 20). The power transmission device 16 also includes a mechanical oil pump 34 coupled to the pump impeller 20p. The oil pump 34 is rotationally driven by the engine 12 to generate (discharge) a hydraulic fluid pressure serving as a source pressure for providing a shift control of the multi-speed transmission 22 and supplying lubrication oil to portions of the power transmission path of the power transmission device 16. Therefore, the hydraulic fluid pumped up by the oil pump 34 is supplied as a source pressure of a hydraulic control circuit 50 (see FIG. 1) included in the vehicle 10.

The multi-speed transmission 22 is a multi-speed type automatic transmission constituting a portion of a power transmission path between the engine 12 and the drive wheels 14, and is coupled in series to the engine 12 via the torque converter 20. The multi-speed transmission 22 is a planetary gear type multi-speed transmission having a double pinion type first planetary gear device 36 as well as a single pinion type second planetary gear device 38 and a double pinion type third planetary gear device 40 formed as a Ravigneaux type, on a coaxial line (on the axial center RC). The multi-speed transmission 22 includes hydraulic friction engagement devices, i.e., a first clutch C1, a second clutch C2, a third clutch C3, a fourth clutch C4, a first brake B1, and a second brake B2 (hereinafter simply referred to as engagement devices C if not particularly distinguished).

The first planetary gear device 36 includes a first sun gear S1, a plurality of pairs of first planetary gears P1 meshing with each other, a first carrier CA1 supporting the first planetary gear P1 such that the first planetary gear P1 is rotatable about its axis and an axis of the first planetary gear device, and a first ring gear R1 meshing via the first planetary gear P1 with the first sun gear S1. The second planetary gear device 38 includes a second sun gear S2, a second planetary gear P2, a carrier RCA supporting the second planetary gear P2 such that the second planetary gear P2 is rotatable about its axis and an axis of the second planetary gear device, and a ring gear RR meshing via the second planetary gear P2 with the second sun gear S2. The third planetary gear device 40 includes a third sun gear S3, a plurality of pairs of third planetary gears P3a, P3b meshing with each other, a carrier RCA supporting the third planetary gears P3a, P3b such that the third planetary gears P3a, P3b are rotatable about its axis and an axis of the third planetary gear device, and a ring gear RR meshing via the third planetary gears P3a, P3b with the third sun gear S3. In the second planetary gear device 38 and the third planetary gear device 40, the third planetary gear P3b and the second planetary gear P2 are commonalized, and the carriers are made up of the common carrier RCA while the ring gears are made up of the common ring gear RR, so that a so-called Ravigneaux type is achieved.

In the multi-speed transmission 22, the first sun gear S1 is coupled to the case 18. The first carrier CA1 is coupled to the input shaft 32. The first carrier CA1 and the second sun gear S2 are selectively coupled via the fourth clutch C4. The first ring gear R1 and the third sun gear S3 are selectively coupled via the first clutch C1. The first ring gear R1 and the second sun gear S2 are selectively coupled via the third clutch C3. The second sun gear S2 is selectively coupled via the first brake B1 to the case 18. The carrier RCA is selectively coupled via the second clutch C2 to the input shaft 32. The carrier RCA is selectively coupled via the second brake B2 to the case 18. The ring gear RR is coupled to the transmission output gear 24.

The multi-speed transmission 22 has a plurality of gear positions (gear shift positions) different in gear ratio (speed change ratio) $\gamma$ (=input shaft rotation speed Nin/output shaft rotation speed Nout) selectively established by controlling engagement and release of the engagement devices C by the electronic control device 70 described later in accordance with a driver's accelerator operation, a vehicle speed V, etc. For example, as shown in an engagement operation table in FIG. 3, the multi-speed transmission 22 has eight forward gear positions from a first speed gear position "1st" to an eighth speed gear position "8th" and a reverse gear position "Rev" such that the gear positions are selectively established. The input shaft rotation speed Nin is the rotation speed of the input shaft 32 and the output shaft rotation speed Nout is the rotation speed of the transmission output gear 24. The gear ratio $\gamma$ of the multi-speed transmission 22 corresponding to each of the gear positions is appropriately defined by gear ratios (=the number of teeth of the sun gear/the number of teeth of the ring gear) $\rho1$, $\rho2$, and $\rho3$ of the first planetary gear device 36, the second planetary gear device 38, and the third planetary gear device 40. The gear ratio $\gamma$ is the highest at the first speed gear position "1st" and decreases toward the higher vehicle speed side (the eighth speed gear position "8th" side).

The engagement operation table of FIG. 3 represents the relationship between the gear positions established in the multi-speed transmission 22 and the operation states of the engagement devices C, and "O" and a blank indicate engagement and release of the engagement devices C, respectively. As shown in FIG. 3, among the forward gear positions, the first speed gear position "1st" is established by engagement of the first clutch C1 and the second brake B2. The second speed gear position "2nd" is established by engagement of the first clutch C1 and the first brake B1. The third speed gear position "3rd" is established by engagement of the first clutch C1 and the third clutch C3. The fourth speed gear position "4th" is established by engagement of the first clutch C1 and the fourth clutch C4. The fifth speed gear position "5th" is established by engagement of the first clutch C1 and the second clutch C2. The sixth speed gear position "6th" is established by engagement of the second clutch C2 and the fourth clutch C4. The seventh speed gear position "7th" is established by engagement of the second clutch C2 and the third clutch C3. The eighth speed gear position "8th" is established by engagement of the second clutch C2 and the first brake B1. The reverse gear position "Rev" is established by engagement of the third clutch C3 and the second brake B2. When the engagement devices C are all released, the multi-speed transmission 22 is brought into a neutral state in which no gear position is established (i.e., a neutral state in which power transmission is interrupted).

Returning to FIG. 1, the vehicle 10 includes the electronic control device 70 including a control device of the vehicle 10 related to the shift control of the multi-speed transmission 22, for example. Therefore, FIG. 1 is a diagram of an input/output system of the electronic control device 70 and is a functional block diagram for explaining a main portion of the control function by the electronic control device 70. The electronic control device 70 includes a so-called microcomputer including a CPU, a RAM, a ROM, and an I/O interface, for example, and the CPU executes signal processes in accordance with a program stored in advance in the ROM, while utilizing a temporary storage function of the RAM, to provide various controls of the vehicle 10. For example, the electronic control device 70 provides the output control of the engine 12, the shift control of the multi-speed transmission 22, etc., and is configured separately for the engine output control, the hydraulic control (the shift control), etc., as needed. The electronic control device 70 corresponds to a shift control device of the present invention.

The electronic control device 70 is supplied with each of signals including: a signal indicative of an engine rotation speed Ne detected by an engine rotation speed sensor 52 disposed on the vehicle 10; a signal indicative of the input shaft rotation speed Nin (=turbine rotation speed Nt) that is also the rotation speed of the input shaft 32 detected by an input shaft rotation speed sensor 54; a signal indicative of the output shaft rotation speed Nout of the transmission output gear 24 corresponding to the vehicle speed V detected by an output shaft rotation speed sensor 56; a signal indicative of an accelerator opening degree $\theta$acc that is an operation amount of an accelerator pedal detected by an accelerator opening degree sensor 58; a signal indicative of a throttle valve opening degree $\theta$th that is an opening degree of an electronic throttle valve detected by a throttle valve opening degree sensor 60; a signal indicative of an operation state (brake-on Bon) of a foot brake detected by a brake switch 62; a signal indicative of an operation position (shift operation position) POSsh of a shift lever such as "P", "R", "N", and "D" detected by a shift position sensor 64; a signal indicative of a hydraulic fluid temperature THoil that is a temperature of hydraulic fluid in the hydraulic control circuit 50 detected by an oil temperature sensor 66; and a signal indicative of an upshift command Sup and a downshift command Sdown based on an operation of paddle switches 69a, 69b (hereinafter referred to as a paddle switch 69 if not particularly distinguished) disposed on a steering wheel 68. The upshift command Sup is output when the paddle switch 69a is operated, the downshift command Sdown is output when the paddle switch 69b is operated, and the number of gear positions is increased or decreased in proportion to the number of operations of the paddle switch 69.

The electronic control device 70 supplies various devices included in the vehicle 10 (e.g., the engine 12 and the hydraulic control circuit 50) with various command signals (e.g., an engine control command signal Se and a hydraulic pressure control command signal Sat). This hydraulic pressure control command signal Sat is a command signal (hydraulic pressure command value, instruction pressure) for driving the solenoid valves regulating the hydraulic pressures supplied to the hydraulic actuators of the engagement devices C and is output to the hydraulic control circuit 50.

The hydraulic control circuit 50 includes a solenoid valve SL1 for regulating a hydraulic pressure Pc1 (of the hydraulic actuator) of the first clutch C1, a solenoid valve SL2 for regulating a hydraulic pressure Pc2 of the second clutch C2, a solenoid valve SL3 for regulating a hydraulic pressure Pc3 of the third clutch C3, a solenoid valve SL4 for regulating a hydraulic pressure Pc4 of the fourth clutch C4, a solenoid valve SL5 for regulating a hydraulic pressure Pb1 of the first brake B1, and a solenoid valve SL6 for regulating a hydraulic pressure Pb2 of the second brake B2. The solenoid valves SL1 to SL6 regulate the hydraulic pressures Pc of the engagement devices C based on the hydraulic pressure control command signal Sat output from the electronic control device 70.

To implement the control function for various controls in the vehicle 10, the electronic control device 70 functionally includes an engine control means, i.e., an engine control portion 72, a shift control means, i.e., a shift control portion 74, and a blipping control determining means, i.e., a blipping control determining portion 75. The engine control portion 72 and the shift control portion 74 correspond to a control portion of the present invention.

The engine control portion 72 applies the accelerator opening degree θacc and the vehicle speed V (synonymous with the output shaft rotation speed Nout, etc.) to a relationship (e.g., a driving force map) obtained empirically or through design and stored in advance (i.e., predefined) to calculate a driver request torque Tdem. The engine control portion 72 sets a required engine torque Te* at which the driver request torque Tdem is acquired, in consideration of a transmission loss, an accessory load, the gear ratio γ of the multi-speed transmission 22, etc., and outputs the engine control command signal Se for providing the output control of the engine 12 to a throttle actuator, a fuel injection device, an ignition device, etc. such that the required engine torque Te* is acquired.

The shift control portion 74 uses a predefined relationship (shift map, shift diagram) to determine whether to provide a gear switching control switching the gear position of the multi-speed transmission 22, and thereby determines a shift of the multi-speed transmission 22. The shift control portion 74 applies a vehicle speed related value and a drive request amount to the shift map to determine the shift of the multi-speed transmission 22 (i.e., determine the gear position to be established in the multi-speed transmission 22). When the paddle switch 69 is operated by the driver, the shift control portion 74 determines the shift to a gear position intended by the operation of the paddle switch 69. The shift control portion 74 outputs to the hydraulic control circuit 50 the hydraulic pressure control command signal Sat for engaging and/or releasing the engagement devices C involved in the shift of the multi-speed transmission 22 so as to establish the determined gear position.

The shift map is a predetermined relationship having shift lines for determining the shift of the multi-speed transmission 22 on two-dimensional coordinates having the vehicle speed related value and the drive request amount as variables. The shift lines in the shift map are upshift lines for determining an upshift and downshift lines for determining a downshift. The upshift lines and the downshift lines are each determined in advance between gear positions having a difference of one speed from each other in a plurality of gear positions. The shift lines are each used for determining whether the line is crossed by the actual vehicle speed related value on a line indicative of a certain drive request amount or whether the line is crossed by the actual drive request amount on a line indicative of a certain vehicle speed related value, i.e., whether the vehicle speed related value or the drive request amount has crossed a value (shift point) on the shift line at which a shift should be executed, and are each defined in advance as a series of the shift points. The vehicle speed related value is the vehicle speed V or a value related to the vehicle speed V and is, for example, the vehicle speed V, a wheel speed, or the output shaft rotation speed Nout. The drive request amount is a value representative of a magnitude of a drive request from a driver to the vehicle 10 and is, for example, a required drive force Fdem [N] or a required drive torque [Nm] and a required drive power [W] related to the required drive force Fdem [N]. The accelerator opening degree θacc [%], the throttle valve opening degree θth [%], the intake air amount [g/sec], etc. can simply be used as the drive request amount.

When determining a shift to a predetermined gear position of the multi-speed transmission 22, the shift control portion 74 performs a so-called clutch-to-clutch shift making a change in engagement of the engagement devices C involved in the shift of the multi-speed transmission 22 (i.e., engaging an engagement-side engagement device to be engaged after the shift and releasing a release-side engagement device to be released after the shift). For example, in the 2-to-3 upshift from the second speed gear position 2nd to the third speed gear position 3rd, a change in engagement is made between the first brake B1 and the third clutch C3 (i.e., the clutch-to-clutch shift is performed by releasing the first brake B1 and engaging the third clutch C3). In this example, out of the engagement devices C to be changed in engagement at the time of the shift, a frictional engagement device to be released is referred to as a release-side engagement device, and a frictional engagement device to be engaged is referred to as an engagement-side engagement device. The hydraulic pressure control command signal Sat is a release-side instruction pressure for acquiring a torque capacity (clutch torque) of the release-side engagement device during the shift and an engagement-side instruction pressure for acquiring a torque capacity (clutch torque) of the engagement-side engagement device during the shift.

If a downshift of the multi-speed transmission 22 is determined, for example, since the paddle switch 69b is operated by the driver, during inertia running while the driver does not depress the accelerator pedal (i.e., the accelerator opening degree θacc is zero), the shift control portion 74 causes the shift to proceed through a shift control described below (hereinafter referred to as "blipping control"), instead of causing the shift to proceed through the change in engagement of the engagement devices C described above.

The blipping control determining portion 75 determines whether to provide the blipping control of the multi-speed transmission 22. When the accelerator opening degree θacc is zero (or a small value close to zero) and the downshift command Sdown is output due to the operation of the paddle switch 69b by the driver, the blipping control determining portion 75 determines to provide the blipping control.

If the provision of the blipping control is determined, the shift control portion 74 releases the release-side engagement device to be released after the shift (downshift) to put the multi-speed transmission 22 into the neutral state. Concurrently with the release of the release-side engagement device, the shift control portion 74 puts the engagement-side engagement device to be engaged after the shift into a standby state (packed state). The standby state is a state in which an engagement device does not have a torque capacity, but a state immediately before having a torque capacity. When the multi-speed transmission 22 enters the neutral state (or a substantially neutral state), the shift control portion 74 outputs to the engine control portion 72 a command to perform a torque-up control (hereinafter referred to as "torque-up") of the engine 12 such that the input shaft rotation speed Nin of the multi-speed transmission 22 is synchronized with an input shaft rotation speed set after the shift (hereinafter referred to as a synchronous rotation speed Ns).

When receiving the command to perform the torque-up of the engine 12, the engine control portion 72 starts a torque-up control of the engine 12 such that the input shaft rotation speed Nin increases toward the synchronous rotation speed Ns. First, to improve responsiveness of an actual torque Te to a required engine torque Te* (instruction value, target value) of the engine 12, the engine control portion 72 sets the required engine torque Te* of the engine 12 to a first required torque Tre1 for a predetermined time and provides a first torque-up control of controlling the engine 12 to achieve the first required torque Tre1 (i.e., by using the first required torque Tre1 as a target). The first required torque Tre1 is obtained empirically or through design and stored in advance, is a value at which the actual torque Te rapidly follows the required engine torque Te* (the responsiveness of the actual torque Te to the required engine torque Te* is enhanced) in consideration of a response delay of an intake air amount of the engine 12 etc., and is set to a value higher than a second required torque Tre2 for allowing the shift to proceed described later.

Subsequently, when a predetermined time has elapsed from the start of the first torque-up control and the multi-speed transmission 22 has entered the neutral state, the engine control portion 72 sets the second required torque Tre2 for allowing the shift of the multi-speed transmission 22 to proceed as the required engine torque Te* and provides a second torque-up control of controlling the engine 12 to achieve the second required torque Tre2 (i.e., by using the second required torque Tre2 as a target). This second required torque Tre2 is obtained empirically or through design and stored in advance and is set to a value at which the input shaft rotation speed Nin increases toward the synchronous rotation speed Ns at a preset increasing rate. The engine control portion 72 stores a relationship map for obtaining the second required torque Tre2 having, for example, a shift pattern and the vehicle speed V as parameters, applies the shift pattern and the vehicle speed V to this relationship map to obtain the second required torque Tre2, and controls the engine 12 to achieve the second required torque Tre2.

When the input shaft rotation speed Nin is synchronized with the synchronous rotation speed Ns after the shift (or a difference between the input shaft rotation speed Nin and the synchronous rotation speed Ns becomes equal to or less than a predetermined value) through the torque-up control, the shift control portion 74 engages the engagement-side engagement device to be engaged after the shift to complete the downshift (blipping control).

By providing the blipping control of the multi-speed transmission 22 described above, the input shaft rotation speed Nin is rapidly raised to the synchronous rotation speed Ns through the torque-up control of the engine 12, so that the shift time is shortened and that a shock generated at the time of engagement of the engagement-side engagement device is reduced.

However, if a shift pattern has a large internal inertia I of the multi-speed transmission 22 during the downshift in the blipping control of the multi-speed transmission 22 described above, a shock (shift shock) may occur because of a rapid increase in an output shaft torque Tout output from the multi-speed transmission 22 since a drive force is transmitted to the output side of the multi-speed transmission 22 (toward the drive wheels 14) in response to a reaction force due to the internal inertia I associated with an increase in rotation speed due to the torque-up control of the engine 12, even when the multi-speed transmission 22 is in the neutral state.

Figure 4:
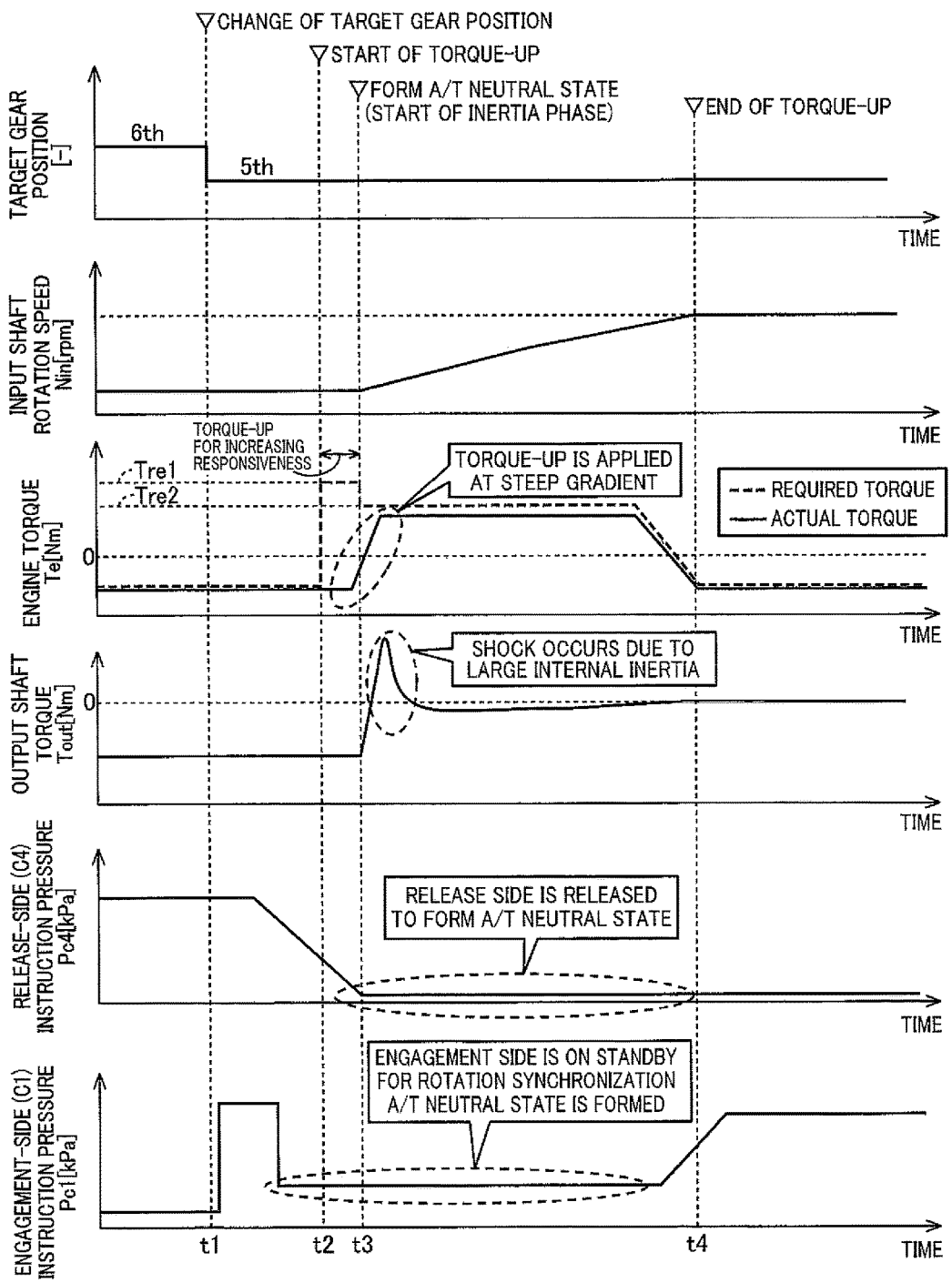
FIG. 4 is a time chart for explaining a control state when a blipping control is provided in a shift pattern having the large internal inertia of the multi-speed transmission.

FIG. 4 is a time chart for explaining a control state when the blipping control is provided in a shift pattern having the large internal inertia I of the multi-speed transmission 22 (e.g., a downshift from the sixth speed gear position "6th" to the fifth speed gear position "5th"). In FIG. 4, time t1 corresponds to a time point when a shift command from the sixth speed gear position "6th" to the fifth speed gear position "5th" is output; time t2 corresponds to a time point when the torque-up control of the engine 12 is started; time t3 corresponds to a time point when the multi-speed transmission 22 enters the neutral state and an inertia phase is started; and time t4 corresponds to a time point when the torque-up control of the engine 12 is terminated. In the downshift from the sixth speed gear position "6th" to the fifth speed gear position "5th", the fourth clutch C4 corresponds to the release-side engagement device, and the first clutch C1 corresponds to the engagement-side engagement device.

When the shift command is output at time t1, the downshift (blipping control) from the sixth speed gear position "6th" to the fifth speed gear position "5th" is started. From time t1 to time t2, the first clutch C1 corresponding to the engagement-side engagement device is put into the standby state (packed state) immediately before having a torque capacity, and the fourth clutch C4 corresponding to the release-side engagement device has an instruction pressure for Pc4 lowered for releasing the fourth clutch C4. At time t2, the torque-up control of the engine 12 is started. From time t2 to time t3, to improve the responsiveness of the actual torque Te indicated by a solid line to the required engine torque Te* (instruction value) of the engine 12 indicated by a broken line, the required engine torque Te* of the engine 12 is set to the first required torque Tre1, and the first torque-up control is provided to control the output of the engine 12 by using the first required torque Tre1 as a target. When the multi-speed transmission 22 enters the neutral state at time t3, the inertia phase is started, and the second torque-up control is started to set the required engine torque Te* (instruction value) of the engine 12 to the second required torque Tre2. In this way, the first torque-up control and the second torque-up control are provided in order. In this case, since the internal inertia I of the multi-speed transmission 22 is large, even if the multi-speed transmission 22 is in the neutral state, the torque of the engine 12 is transmitted toward the drive wheels 14 in response to the reaction force due to the internal inertia I, so that the output shaft torque Tout rapidly increases and the shift shock occurs.

To prevent the shift shock occurring during the blipping control, the electronic control device 70 functionally includes an internal inertia deciding means, i.e., an internal inertia deciding portion 76, an internal inertia determining means, i.e., an internal inertia determining portion 78, and a torque setting means, i.e., a torque setting portion 80 as shown in FIG. 1.

The internal inertia deciding portion 76 decides the internal inertia I during the downshift of the multi-speed transmission 22. The internal inertia I of the multi-speed transmission 22 during the downshift is decided based on the engagement device kept engaged before and after the shift (hereinafter referred to as an engagement device Ck). Specifically, the internal inertia I is the sum of the moments of inertia of the rotating elements mechanically connected via the engagement device Ck. Therefore, the internal inertia I is obtained by calculating the respective moments of inertia of the rotating elements mechanically connected via the engagement device Ck, and adding all the calculated inertia moments of the rotating elements. Since the engagement device Ck kept engaged before and after the shift is determined for each shift pattern, the internal inertia I is obtained for each shift pattern. The internal inertia deciding portion 76 stores the internal inertia I obtained in advance for each shift pattern, determines the shift pattern of the downshift to be performed, and uses the internal inertia I stored for each shift pattern so as to decide the internal inertia I. The engagement device Ck corresponds to a frictional engagement device kept engaged before and after the shift of the present invention.

In this example, as shown in FIG. 3, in the downshift from the eighth speed gear position "8th" to the seventh speed gear position "7th", the downshift from the seventh speed gear position "7th" to the sixth speed gear position "6th", and the downshift from the sixth speed gear position "6th" to the fifth speed gear position "5th", the engagement device Ck kept engaged before and after the shift is the second clutch C2. Therefore, the internal inertia I has the same value in these shift patterns. It is assumed that the shift patterns with the second clutch C2 engaged before and after the shift correspond to a shift pattern in which the internal inertia I during the downshift is larger than a predetermined value Ip, i.e., a shift pattern having the large internal inertia I. In the downshift from the fifth speed gear position "5th" to the fourth speed gear position "4th", the downshift from the fourth speed gear position "4th" to the third speed gear position "3rd", the downshift from the third speed gear position "3rd" to the second speed gear position "2nd", and the downshift from the second speed gear position "2nd" to the first speed gear position "1st", the engagement device Ck kept engaged before and after the shift is the first clutch C1. Therefore, the internal inertia I has the same value in these shift patterns. It is assumed that the shift patterns with the first clutch C1 engaged before and after the shift correspond to a shift pattern in which the internal inertia I during the downshift is not more than the predetermined value Ip, i.e., a shift pattern having the small internal inertia I.

The internal inertia determining portion 78 determines whether the internal inertia I obtained by the internal inertia deciding portion 76 is larger than the predetermined value Ip set in advance, and determines that the shift pattern has the large internal inertia I if the internal inertia I is larger than the predetermined value Ip or that the shift pattern has the small internal inertia I if the internal inertia I is not more than the predetermined value Ip. The predetermined value Ip is obtained empirically or through design in advance and is set to a threshold value at which a change in the output shaft torque Tout (or a vehicle longitudinal acceleration G) falls within a range where a driver does not feel strange when the torque-up control of the engine 12 is provided while the internal inertia I is at the predetermined value Ip, or a value close to the threshold value. The internal inertia determining portion 78 corresponds to a determining portion of the present invention.

If the internal inertia determining portion 78 determines that the shift pattern has the internal inertia I not more than the predetermined value Ip, the engine control portion 72 sets the required engine torque Te* (instruction value) at the time of the first torque-up control to the above-described first required torque Tre1 in consideration of the responsiveness of the actual torque Te in the torque-up control of the engine 12. Even if the required engine torque Te* is set to the first required torque Tre1 in consideration of the responsiveness of the actual torque Te, since the internal inertia I is not more than the predetermined value Ip, the change in the output shaft torque Tout due to the reaction force of the internal inertia I at the time of the torque-up control of the engine 12 falls within a range in which a drive does not feel strange. Additionally, since the responsiveness of the actual torque Te is improved, the shift time does not become longer and the drivability is improved.

On the other hand, if the internal inertia determining portion 78 determines that the shift pattern has the internal inertia I larger than the predetermined value Ip, the torque setting portion 80 sets the first required torque Tre1 set at the time of the first torque-up control as described later. The first required torque Tre1 corresponds to a required torque during torque-up of the internal combustion engine of the present invention.

In the case of the shift pattern having the large internal inertia I (the internal inertia I larger than the predetermined value Ip), the torque setting portion 80 makes the first required torque Tre1 set at the time of the first torque-up control smaller than the first required torque Tre1 set in the case of the shift pattern having the small internal inertia I (the internal inertia I not more than the predetermined value Ip) so that the increasing rate of the actual torque Te during the torque-up control becomes smaller as compared to the shift pattern having the small internal inertia I.

In the case of the shift pattern having the large internal inertia I, the torque setting portion 80 corrects the first required torque Tre1 set in the case of the shift pattern having the small internal inertia I (the shift pattern having the internal inertia I not more than the predetermined value Ip). Specifically, the torque setting portion 80 multiplies the first required torque Tre1 set in the case of the shift pattern having the small internal inertia I, for example, by a correction coefficient α smaller than 1.0 set in advance (Tre1*α), so as to correct the torque to the first required torque Tre1 (hereinafter referred to as a corrected first required torque Tre1c for distinction) set in the case of the shift pattern having the large internal inertia I. The torque setting portion 80 stores a relationship map composed of the internal inertia I and the correction coefficient α, for example, and applies the internal inertia I to the relationship map to decide the correction coefficient α, and multiplies the first required torque Tre1 set in the case of the shift pattern having the smaller internal inertia I by the decided correction coefficient α to correct (set) the torque to the corrected first required torque Tre1c smaller than the first required torque Tre1.

The correction coefficient α is obtained empirically or through design and stored in advance and is set to a value at which the increasing rate of the actual torque Te of the engine 12 becomes gentler when the corrected first required torque Tre1c corrected by the correction coefficient α is set as the required engine torque Te*, as compared to when the first required torque Tre1 in the case of the small internal inertia I is set as the required engine torque Te*, so that a rapid change in the output shaft torque Tout during the torque-up control is suppressed. The correction coefficient α is set to a smaller value as the internal inertia I becomes larger. When the internal inertia I becomes larger, the drive force transmitted toward the drive wheels 14 also becomes larger in proportion thereto with the internal inertia I serving as the reaction force when the torque-up control of the engine 12 is provided. Taking this into consideration, the correction coefficient α is made smaller as the internal inertia I becomes larger, so that the corrected first required torque Tre1c is corrected to a smaller value as the internal inertia I becomes larger, and a rapid change in the output shaft torque Tout is appropriately suppressed.

The engine control portion 72 controls the engine 12 by using the corrected first required torque Tre1c set by the torque setting portion 80 as the required engine torque Te* (indication value, target value). In this case, since the actual torque Te of the engine 12 gently increases as compared to the case of the shift pattern having the small internal inertia I, a rapid change in the output shaft torque Tout is suppressed. The engine control portion 72 terminates the torque-up control of the engine 12 when the input shaft rotation speed Nin is synchronized (or substantially synchronized) with the synchronous rotation speed Ns and the inertia phase ends. Subsequently, the shift control portion 74 engages the engagement-side engagement device to complete the downshift (blipping control). The engagement of the engagement-side engagement device may be started from a time point before the end of the inertia phase.

Figure 5:
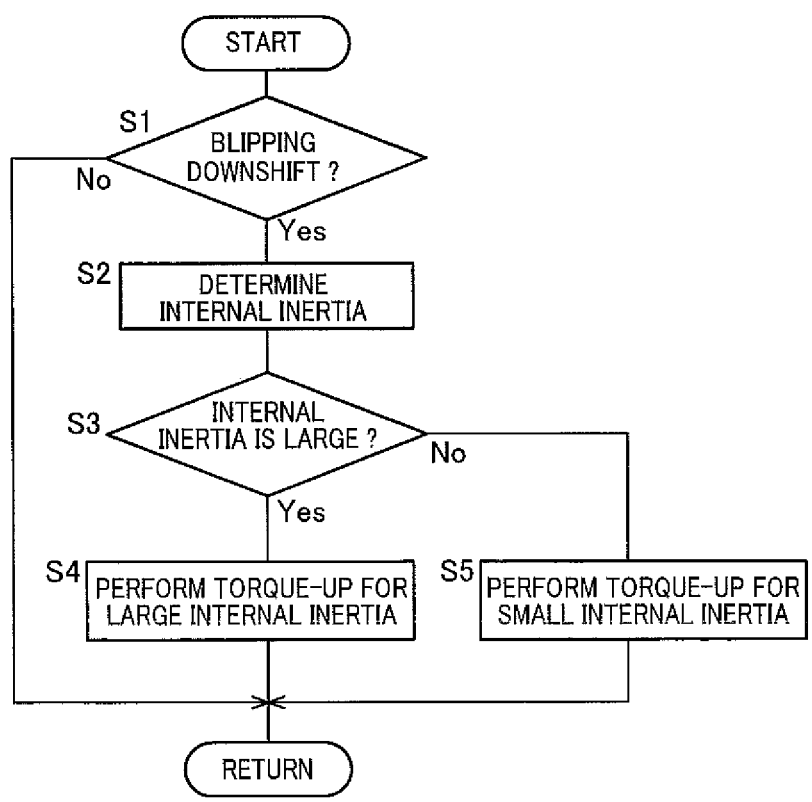
FIG. 5 is a flowchart for explaining a main portion of the control operation of an electronic control device of FIG. 1, i.e. the control operation of suppressing the shift shock occurring during the blipping control.

FIG. 5 is a flowchart for explaining a main portion of the control operation of the electronic control device 70, i.e. the control operation of suppressing the shift shock occurring during the blipping control. This flowchart is repeatedly executed during running of the vehicle.

First, at step S1 (hereinafter, step is omitted) corresponding to the control function of the blipping control determining portion 75, it is determined whether the blipping control (downshift with the blipping control) of the multi-speed transmission 22 is provided. If S1 is negative, this routine is terminated. If S1 is affirmative, the internal inertia I is decided based on the engagement device Ck kept engaged before and after the shift at the time of the blipping control at S2 corresponding to the control operation of the internal inertia deciding portion 76. At S3 corresponding to the control function of the internal inertia determining portion 78, it is determined whether the internal inertia I decided at S2 is larger than the predetermined value Ip. If the internal inertia I is larger than the predetermined value Ip, it is determined that the shift pattern has the large internal inertia I, and the operation goes to S4. On the other hand, if the internal inertia I is not more than the predetermined value Ip, it is determined that the shift pattern has the small internal inertia I, and the operation goes to S5.

At S4 corresponding to the control function of the engine control portion 72 and the torque setting portion 80, the first required torque Tre1 set at the time of the first torque-up control of the engine 12 is corrected to the corrected first required torque Tre1c smaller than the first required torque Tre1 set in the case of the shift pattern having the small internal inertia I, and the torque-up control of the engine 12 is provided with the corrected first required torque Tre1c as a target. At the S5 corresponding to the control function of the engine control portion 72, the correction is not made and the torque-up control of the engine 12 is provided with the first required torque Tre1 set in the case of the shift pattern having the small internal inertia I as a target.

Figure 6:
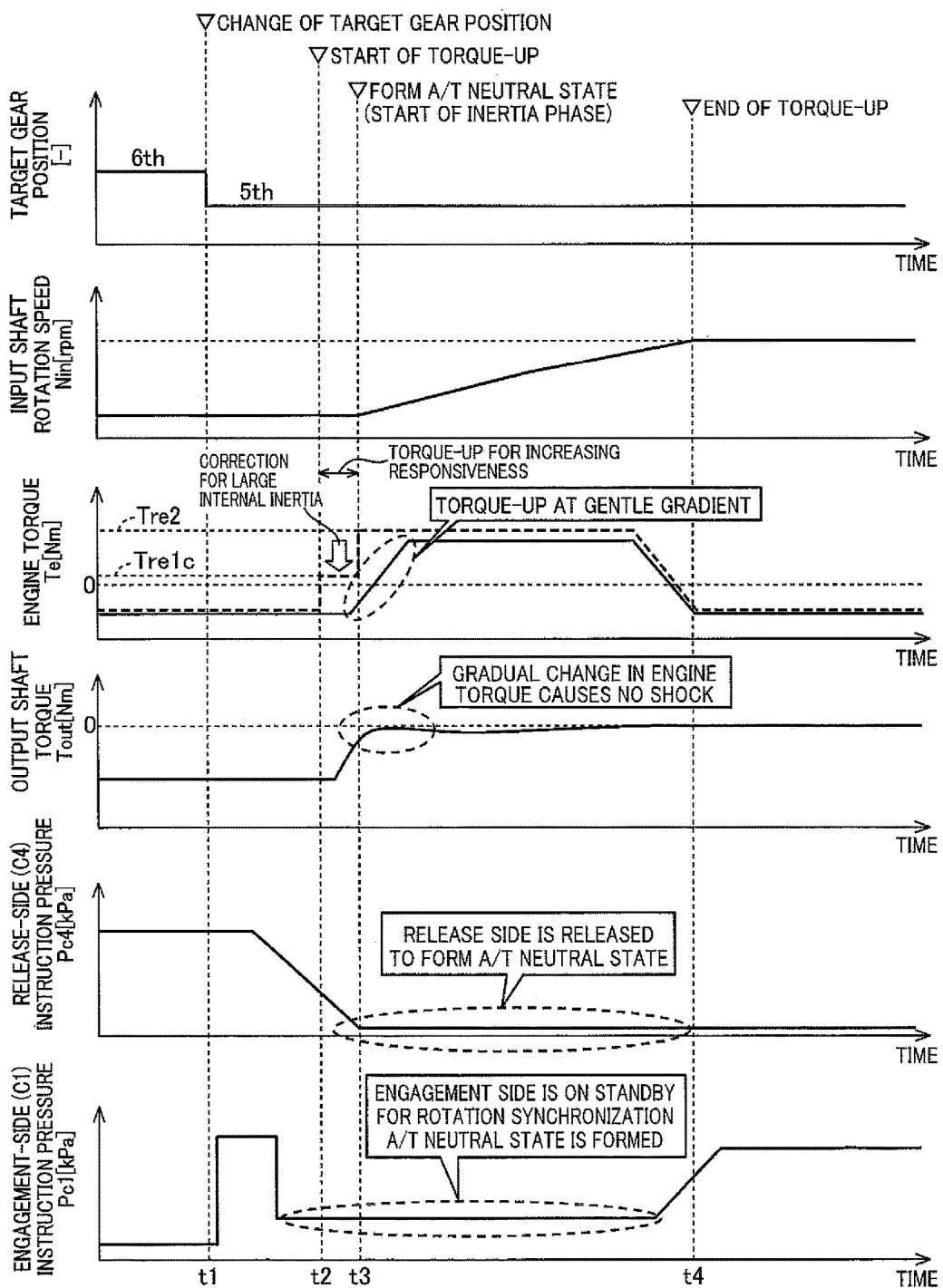
FIG. 6 is an example of a time chart showing a control state when the blipping control is provided based on the flowchart of FIG. 5.

FIG. 6 is an example of a time chart showing a control state when the blipping control from the sixth speed gear position "6th" to the fifth speed gear position "5th" is provided based on the flowchart of FIG. 5. This time chart corresponds to the case of the internal inertia I of the multi-speed transmission 22 larger than the predetermined value Ip. Time t1 corresponds to a time point when a shift command from the sixth speed gear position "6th" to the fifth speed gear position "5th" is output; time t2 corresponds to a time point when the torque-up of the engine 12 is started; time t3 corresponds to a time point when the multi-speed transmission 22 enters the neutral state and the inertia phase is started; and time t4 corresponds to a time point when the torque-up control of the engine 12 is terminated.

When the shift command is output at time t1, the downshift (blipping control) from the sixth speed gear position "6th" to the fifth speed gear position "5th" is started. From time t1 to time t2, the first clutch C1 corresponding to the engagement-side engagement device is put into the standby state (packed state) immediately before having a torque capacity, and the fourth clutch C4 corresponding to the release-side engagement device C4 has the instruction pressure Pc4 lowered for the release thereof. At time t2, the torque-up control of the engine 12 is started. In this downshift from the sixth speed gear position "6th" to the fifth speed gear position "5th", it is determined that the internal inertia I exceeds the predetermined value Ip, and the target value at the time of the first torque-up control is corrected to the corrected first required torque Tre1c which is a value smaller than the first required torque Tre1 before correction shown in FIG. 4. Accordingly, the increasing rate of the actual torque Te of the engine 12 becomes gentler as compared to the actual torque Te of FIG. 4, so that a rapid change in the output shaft torque Tout is suppressed.

As described above, according to this example, when the shift pattern has the large internal inertia I of the multi-speed transmission 22 during the downshift, the increasing rate of the actual torque Te of the engine 12 becomes smaller as compared to when the shift pattern has the small internal inertia I, so that the actual torque Te of the engine 12 gradually increases in the shift pattern having the large internal inertia I, thereby suppressing the torque transmission to the output side of the multi-speed transmission 22 due to the reaction force of the internal inertia I. Therefore, the shift shock is restrained from occurring due to a rapid increase in the output shaft torque Tout.

According to the present example, when the shift pattern has the large internal inertia I, the first required torque Tre1 of the engine 12 according to the first torque-up control becomes smaller as compared to when the shift pattern has the small internal inertia I, so that the actual torque Te of the engine 12 gradually increases, thereby suppressing the rapid change in the output shaft torque Tout of the multi-speed transmission 22 due to the reaction force of the internal inertia I.

Although the example of the present invention has been described in detail with reference to the drawings, the present invention can be also applied in other forms.

For example, in the example described above, the internal inertia I is obtained from the shift pattern during the downshift and the execution of the correction of the first required torque Tre1 is determined based on whether the internal inertia I is larger than the predetermined value Ip; however, since the engagement device Ck kept engaged before and after the shift is determined in advance for each shift pattern and the internal inertia I can therefore be obtained in advance for each shift pattern, the shift pattern having the first required torque Tre1 to be corrected may be defined in advance, and the execution of the correction of the first required torque Tre1 may be determined by determining the shift pattern.

In the example described above, the increasing rate of the actual torque Te of the engine 12 is made gentle by correcting the first required torque Tre1 for increasing the responsiveness of the actual torque Te in the case of the shift pattern having the large internal inertia I in the torque-up control of the engine 12; however, in addition to the correction of the first required torque Tre1, the second required torque Tre2 may also be corrected to reduce the increasing rate of the actual torque Te of the engine 12. Specifically, in the example described above, when the second torque-up control of the engine 12 is provided, the second required torque Tre2 is obtained empirically or through design in advance such that the input shaft rotation speed Nin increases toward the synchronous rotation speed Ns at a predetermined increasing rate, and the second required torque Tre2 is set as the required engine torque Te* of the engine 12; however, when the second required torque Tre2 is corrected, the second required torque Tre2 set in the case of the internal inertia I not more than the predetermined value Ip can be corrected to a new second required torque Tre2 by multiplication by a preset correction coefficient etc. Instead of correction of the first required torque Tre1, the second required torque Tre2 may be corrected to reduce the increasing rate of the actual torque Te of the engine 12.

Although the second required torque Tre2 set at the time of provision of the second torque-up control is a prescribed value obtained empirically or through design in advance in the example described above, the present invention is not necessarily limited thereto and, for example, the second required torque Tre2 may be calculated as needed from a known feedback control equation in which a difference between the increasing rate of the input shaft rotation speed Nin and a preset increasing rate is defined as a deviation. If the second required torque Tre2 calculated as needed from the feedback control equation is corrected, the torque is corrected to a value smaller than the second required torque Tre2 set in the case of the shift pattern having the small internal inertia I, for example, by changing a proportional constant or a differential constant of the feedback control equation as appropriate or by multiplying the calculated second required torque Tre2 by a correction coefficient.

Although the corrected first required torque Tre1c set at the time of the first torque-up control is obtained by multiplying the first required torque Tre1 before correction by the correction coefficient α in the example described above, the corrected first required torque Tre1c may be obtained by subtracting a predetermined value corresponding to the internal inertia I from the first required torque Tre1, for example.

Although the blipping control is provided when the paddle switch 69 is manually operated to the downshift side by the driver during inertia running in the example described above, the present invention is not necessarily limited thereto, and the blipping control may be provided also when the execution of the downshift is determined since a vehicle speed related value or a drive request amount crosses a downshift line in a shifting map which defines shifting conditions. Additionally, the manual operation by the driver is not limited to that with the paddle switch 69 and may appropriately be changed to that with the shift lever etc.

Although the multi-speed transmission 22 is a transmission capable of shifting nine forward speed gear positions in the example described above, the number of gear positions etc., is not limited thereto and may appropriately be changed. In short, the present invention is applicable to any transmission in which a shift between multiple speeds is performed according to engagement and release of frictional engagement devices.

In the example described above, the downshift from the sixth speed gear position "6th" to the fifth speed gear position "5th" has been described as an example; however, the present invention is also applicable to downshifts to other gear positions.

The above description is merely an embodiment and the present invention can be implemented in variously modified and improved forms based on the knowledge of those skilled in the art.

REFERENCE SIGNS LIST

10: Vehicle
12: Engine (Internal combustion engine)
22: Multi-speed transmission
70: Electronic control device (Shift control device)
72: Engine control portion (Control portion)
74: Shift control portion (Control portion)
78: Internal inertia determining portion (Determining portion)
80: Torque setting portion

What is claimed is:

1. A shift control device of a vehicle including an internal combustion engine and a multi-speed transmission in series, the shift control device comprising:
   a control portion configured to provide a downshift control in which an input shaft rotation speed of the multi-speed transmission is increased through a torque-up control of the internal combustion engine toward a post-shift input shaft rotation speed in a neutral state where a release-side frictional engagement device to be released during a downshift of the multi-speed transmission is released, so as to engage an engagement-side frictional engagement device to be engaged after the shift; and
   a torque setting portion configured to set a required torque of the internal combustion engine in the torque-up control of the internal combustion engine such that an increasing rate of an actual torque of the internal combustion engine becomes smaller in the case of a shift pattern having a large internal inertia of the multi-speed transmission during the downshift as compared to the case of a shift pattern in which the internal inertia is small.

2. The shift control device of a vehicle according to claim 1, wherein
- in the torque-up control of the internal combustion engine, the control portion provides in order a first torque-up control of controlling the internal combustion engine by using as a target a first required torque for improving responsiveness of the actual torque to the required torque of the internal combustion engine and a second torque-up control of controlling the internal combustion engine by using as a target a second required torque for increasing the input shaft rotation speed of the multi-speed transmission toward the post-shift input shaft rotation speed, and wherein
- in the case of the shift pattern having the large internal inertia, the torque setting portion corrects the first required torque set in the case of the shift pattern having the small internal inertia such that the first required torque set in the case of the shift pattern having the large internal inertia is made smaller than the first required torque set in the case of the shift pattern having the small internal inertia.

3. The shift control device of a vehicle according to claim 2, comprising a determining portion configured to determine that the shift pattern has the large internal inertia when the internal inertia of the multi-speed transmission during the downshift is larger than a predetermined value set in advance, and that the shift pattern has the small internal inertia when the internal inertia is not more than the predetermined value.

4. The shift control device of a vehicle according to claim 3, wherein the internal inertia of the multi-speed transmission during the downshift is determined based on a frictional engagement device kept engaged before and after the shift.

5. The shift control device of a vehicle according to claim 2, wherein the internal inertia of the multi-speed transmission during the downshift is determined based on a frictional engagement device kept engaged before and after the shift.

6. The shift control device of a vehicle according to claim 1, comprising a determining portion configured to determine that the shift pattern has the large internal inertia when the internal inertia of the multi-speed transmission during the downshift is larger than a predetermined value set in advance, and that the shift pattern has the small internal inertia when the internal inertia is not more than the predetermined value.

7. The shift control device of a vehicle according to claim 6, wherein the internal inertia of the multi-speed transmission during the downshift is determined based on a frictional engagement device kept engaged before and after the shift.

8. The shift control device of a vehicle according to claim 1, wherein the internal inertia of the multi-speed transmission during the downshift is determined based on a frictional engagement device kept engaged before and after the shift.

* * * * *